US005722140A

United States Patent [19]

Marshall

[11] Patent Number: 5,722,140

[45] Date of Patent: Mar. 3, 1998

[54] APPARATUS FOR PULLING GOLF CLUB SHAFTS FROM CLUB HEADS

[76] Inventor: Perry C. Marshall, 103 Granada Ct. North, Plant City, Fla. 33566

[21] Appl. No.: 650,727

[22] Filed: May 20, 1996

Related U.S. Application Data

[63] Continuation-in-part of Ser. No. 575,565, Dec. 20, 1995.

[51] Int. Cl.$^6$ .................................................. B23P 19/04

[52] U.S. Cl. ................................ 29/263; 29/255; 29/270; 29/280

[58] Field of Search ............................ 29/263, 239, 235, 29/234, 237, 255, 238, 261, 270, 280; 269/274

[56] References Cited

U.S. PATENT DOCUMENTS

| | | | |
|---|---|---|---|
| 2,160,395 | 5/1939 | Wettlaufer | 29/239 |
| 4,891,877 | 1/1990 | Talavera | 29/237 |
| 4,901,418 | 2/1990 | Machado et al. | 29/263 |
| 4,910,849 | 3/1990 | Marshall | 29/239 |
| 5,243,883 | 9/1993 | Savage | 269/274 |

*Primary Examiner*—Timothy V. Eley
*Assistant Examiner*—Lee Wilson
*Attorney, Agent, or Firm*—Joseph C. Mason, Jr.

[57] ABSTRACT

An apparatus that separates a golf club head and a golf club shaft to which it is adhesively secured. A hosel push member is positioned in abutting relation to the hosel of the club head. An externally threaded guide tube is slideably inserted over the hand grip of a golf club shaft and is positioned in trailing relation to the hosel push member. A drive member in the form of a coil spring or a rigid tube is ensleeved around the guide tube, and a drive member push member screw threadedly engages the threads on the guide tube so that advancement of the drive member push member applies pressure upon the drive member. Primary and auxiliary stop members grip the shaft on the trailing end of the guide tube to prevent rotation and slippage of the guide tube. Heating the hosel after application of pressure onto the drive member weakens the adhesive and results in separation of the club head from the shaft.

10 Claims, 4 Drawing Sheets

APPARATUS FOR PULLING GOLF CLUB SHAFTS FROM CLUB HEADS

This application in a continuation-in-part of copending application Ser. No. 08/575,565 which was filed on Dec. 20, 1995.

BACKGROUND OF THE INVENTION

1. Field of the Invention

This invention relates, generally, to puller devices that pull tightly secured objects from their mounts. More particularly, it relates to a puller device that pulls golf club heads from golf club shafts.

2. Description of the Prior Art

Modern golf club shafts are made of graphite, graphite reinforced with boron, or fiberglass-reinforced products. Typically, the distal (leading) end of a shaft is axially received within the hosel of the golf club head and secured thereto by a thermoplastic adhesive means. Thus, when it is desired to change shafts, the hosel is heated to release the grip of the adhesive, and the shaft is manually pulled from the hosel.

The drawbacks of the just-described process are several. First of all, manual separation of the shaft and hosel usually twists and destroys the shaft because it is virtually impossible to maintain the required alignment of the shaft while pulling on it. Moreover, few people are strong enough to pull the shaft out until the adhesive has been greatly weakened by the application of a large amount of heat; as a result, the distal end of the shaft becomes hot before the separation of shaft and hosel can be accomplished and the shaft is ruined.

Many modern hosels are made of materials that discolor easily when heat is applied thereto. Thus, it is important to perform the hosel-pulling procedure in a minimum amount of time and at a minimum temperature.

Thus, there is a need for a pulling device that generates a very strong, non-twisting pulling force when a golf club shaft is pulled from a club head so that the shaft can be pulled from the hosel at a time when the temperature of the hosel has been elevated to a temperature sufficient to release the grip of the adhesive but insufficient to adversely affect the coloration of the hosel.

U.S. Pat. No. 2,160,395 to Wettlauffer discloses a golf shaft puller having a nut that is constrained against travel by a washer so that rotation of the nut causes the axial displacement of a sleeve-like body onto which the nut is threaded. The threaded sleeve thus acts as a drive rod that separates the golf club head from the golf club shaft. However, no means are provided to accomplish an abrupt separation of the shaft and head in a non-twisting manner at a low temperature and in a short amount of time.

Other U.S. patents of interest include U.S. Pat. Nos. 1,662,465; 2,991,080; 3,334,405; 4,179,125; 4,317,986; 3,891,212; 4,462,595; 4,674,747; 4,783,893; and UK patent No. 2,186,195. Many of the puller devices of the prior art relate to pulling steel shafts from hosels; the problems relating to shaft twisting and overheating are not encountered when a steel shaft is pulled.

The present inventor's earlier contribution to the art is described in U.S. Pat. No. 4,910,849 (1990). It enables separation of shaft and hosel without damage to the shaft, but the temperature required to accomplish the separation is quite high. Moreover, a bungee cord or similar restraining means is required to prevent the shaft from hurling itself across a room at the moment of separation. Perhaps more importantly, the earlier structure includes an elongate tube for ensleeving the shaft, and positioning of said elongate tube in said ensleeving relation requires removal of the hand grip from the shaft.

What is needed, then, is an improved structure that enables separation of the hosel and shaft at lower temperatures so that the hosel and shaft are subjected to less heat during the separation process. A need also exists for a shaft puller that does not require removal of the hand grip from the shaft being pulled, and which requires no restraining means for the shaft. Moreover, there is a need for a device that occupies less space than the shaft pullers heretofore known, and which generates more pulling power than the earlier shaft pullers.

However, in view of the prior art at the time the present invention was made, it was not obvious to those of ordinary skill in the pertinent art how the identified needs could be fulfilled.

SUMMARY OF THE INVENTION

The present invention is a pulling device specially adapted to pull golf club heads from the shafts to which they are mounted. Significantly, the hand grip of the club need not be removed prior to use of the novel device, the separation of shaft and hosel occurs at a low temperature, and the shaft does not fly from the device at the moment of separation.

The novel device includes a rigid guide tube member that ensleeves a golf club shaft therein; the diameter of the guide tube is sufficient to enable its insertion over a hand grip so that the grip need not be removed prior to use of the novel tool.

A hosel push member is formed of two parts so that it may be positioned on the leading end of the golf club shaft. A leading end of the hosel push member is positioned in abutting relation to an annular shoulder formed by the juncture of the hosel and the golf club shaft, and a trailing end thereof is received within the leading end of the guide tube when the novel assembly is assembled. A radially outwardly extending flange demarcates the leading and trailing ends.

A drive means in the form of a coil spring (first embodiment) or a rigid (preferably steel) tube (second embodiment) ensleeves the guide tube, and a leading end of the drive means abuts the trailing side of the flange of the hosel push member. Accordingly, advancing the drive means in a trailing-to-leading direction applies pressure to the hosel push member and hence to the hosel.

In a first embodiment, the spring is compressed by a distance substantially equal to the depth of penetration of the shaft into the hosel. The hosel is then heated momentarily, and the spring unloads, driving the hosel off the shaft.

In a second embodiment, the drive means is advanced toward the hosel, thereby applying pressure to and displacing the steel drive tube. The hosel is then heated for just a moment, thereby loosening the adhesive. The heat is then removed and the hosel is pushed off by advancing the drive means by hand.

In both the first and second embodiments, the drive means is advanced in a trailing-to-leading direction by a drive means push member that screw threadedly engages the guide tube. A stop member is positioned in abutting relation to the trailing end of the guide tube to prevent rotation of said guide tube and to prevent leading-to-trailing displacement of said guide tube when the drive means push member is advanced.

In a third embodiment, an auxiliary stop member is positioned in abutting relation to the trailing end of the stop member of the first two embodiments to increase the slip resistance of the stop member of said first two embodiments. Moreover, a rod is added to the trailing end of the stop member of said first two embodiments and that rod is gripped by the auxiliary stop member so that the rotational resistance of the auxiliary stop member is transmitted to the primary stop member.

One or more radial bores are formed in the annular periphery of the drive means push member to facilitate its rotation, i.e., rotation of the push member is effected by inserting a rigid rod into a radial bore. Thus, no wrench is required to advance said push member in a trailing-to-leading direction. Alternatively, the drive means push member may be provided in the form of a large wrench-engageable nut. Advancing the push member in said trailing-to-leading direction compresses the bias means of the first embodiment or displaces the rigid steel tube of the second embodiment. Unlike the present inventor's earlier invention, the shaft is not abruptly displaced during or after the hosel removal procedure so no means are required to prevent it from flying from the workstation. Moreover, the novel arrangement disclosed in detail below provides a very high pushing/pulling force so that shaft-hosel separation occurs very quickly and at a very low temperature so that the new apparatus can be used even on hosels that discolor easily.

The primary object of this invention is to provide a device that separates club heads from golf club shafts of the glass, graphite or fiberglass type in the absence of damage to the shaft and discoloration of the hosel.

Another important object is to accomplish the foregoing object with a device that fits over club hand grips so that such grips need not be removed.

Still another object is to provide a shaft puller construction that generates three thousand pounds of pressure or more so that hosel-shaft separation occurs quickly and at a low temperature.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
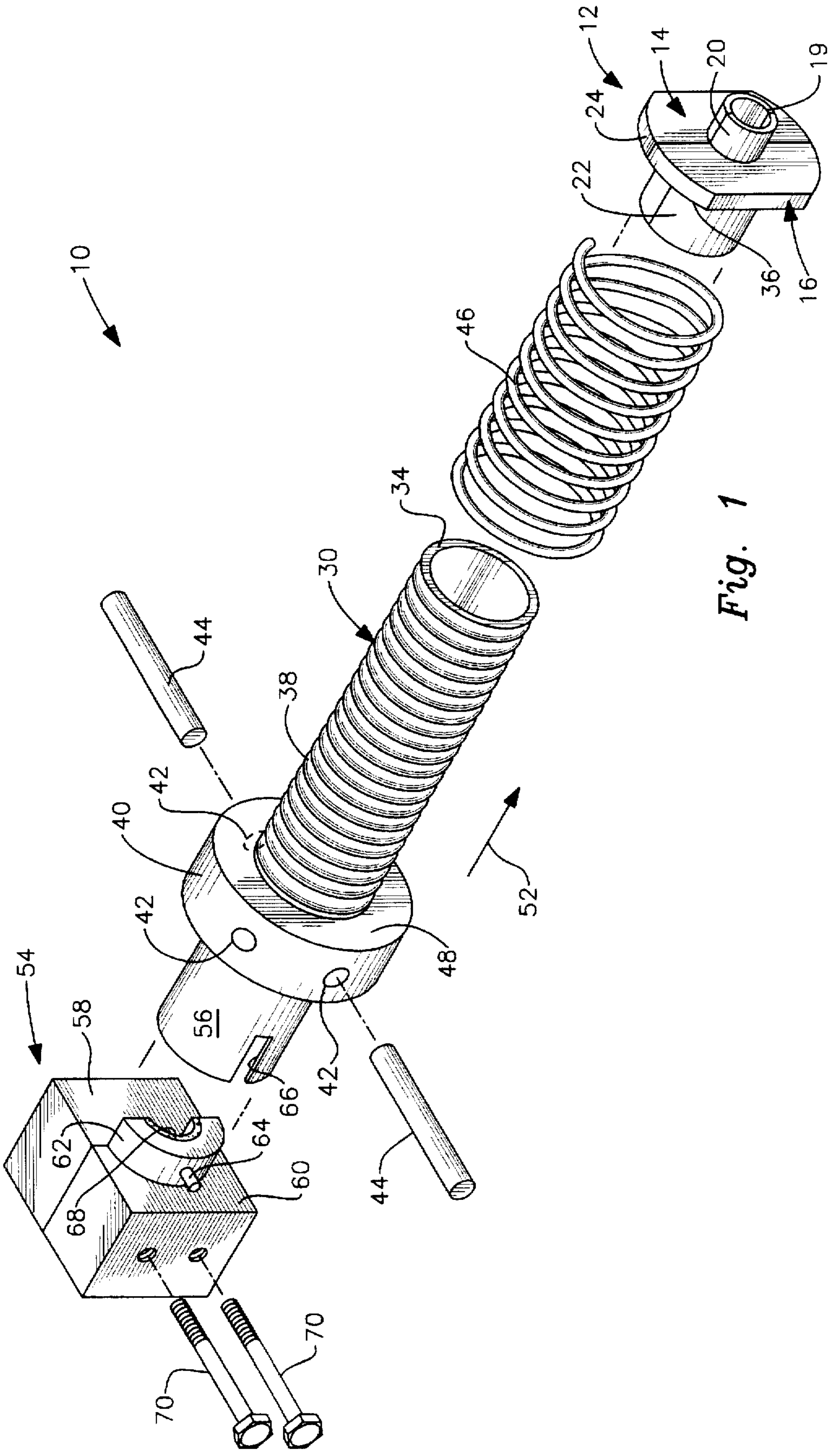
FIG. 1 is a partially exploded perspective view of the parts of a first illustrative embodiment of the invention.

Referring now to FIG. 1, it will there be seen that an illustrative embodiment of the present invention is denoted by the reference numeral 10 as a whole.

The leading end of novel assembly 10 includes a two part hosel push member 12 having symmetrical parts 14 and 16. When assembled in sandwiching relation to club shaft 18, said parts collectively form a cylindrical leading part 20, a cylindrical trailing part 22, and a radially outwardly extending flange 24 therebetween. The leading edge 19 of leading part 20 abuts shoulder 26 (FIG. 3) formed by the juncture of hosel 28 and shaft 18 when the novel apparatus is in use.

Guide tube 30 has an inner diameter sufficient to permit it to ensleeve shaft 18 and hand grip 32 (FIG. 3), i.e., it fits over said hand grip when the novel device is to be used. Leading end 34 (FIG. 1) of guide tube 30 abuts trailing side 36 of flange 24 of hosel push member 12 when the novel apparatus is in its assembled configuration.

Guide tube 30 is externally threaded substantially along most of its extent as at 38, and an internally threaded disc-shaped drive means push member 40 screwthreadedly engages said guide tube so that rotation of said drive means push member 40 in a clockwise direction advances it in a trailing-to-leading direction along the threaded extent of said guide tuber and opposite rotation displaces it in a leading-to-trailing direction.

One or more radial bores, collectively denoted 42, are formed in the periphery of drive means push member 40 in equidistantly and circumferentially spaced relation to one another; one or more rigid rods 44 are selectively placed in one or more of said bores and rotated about a longitudinal axis of the shaft to rotate the disc member in a desired direction to advance or retract it along the extent of said guide tube. In this way, no wrench is required to displace said disc-shaped drive means push member 40. However, as indicated in FIG. 2 (second embodiment), a wrench-engageable conventional nut 41 could be used in lieu of said disc member 40.

In the first embodiment, a drive means in the form of a coil spring 46 ensleeves guide tube 30 and the leading and trailing ends of said spring abut trailing side 36 of flange 24 and leading side 48 of drive means push member 40.

Figure 2:
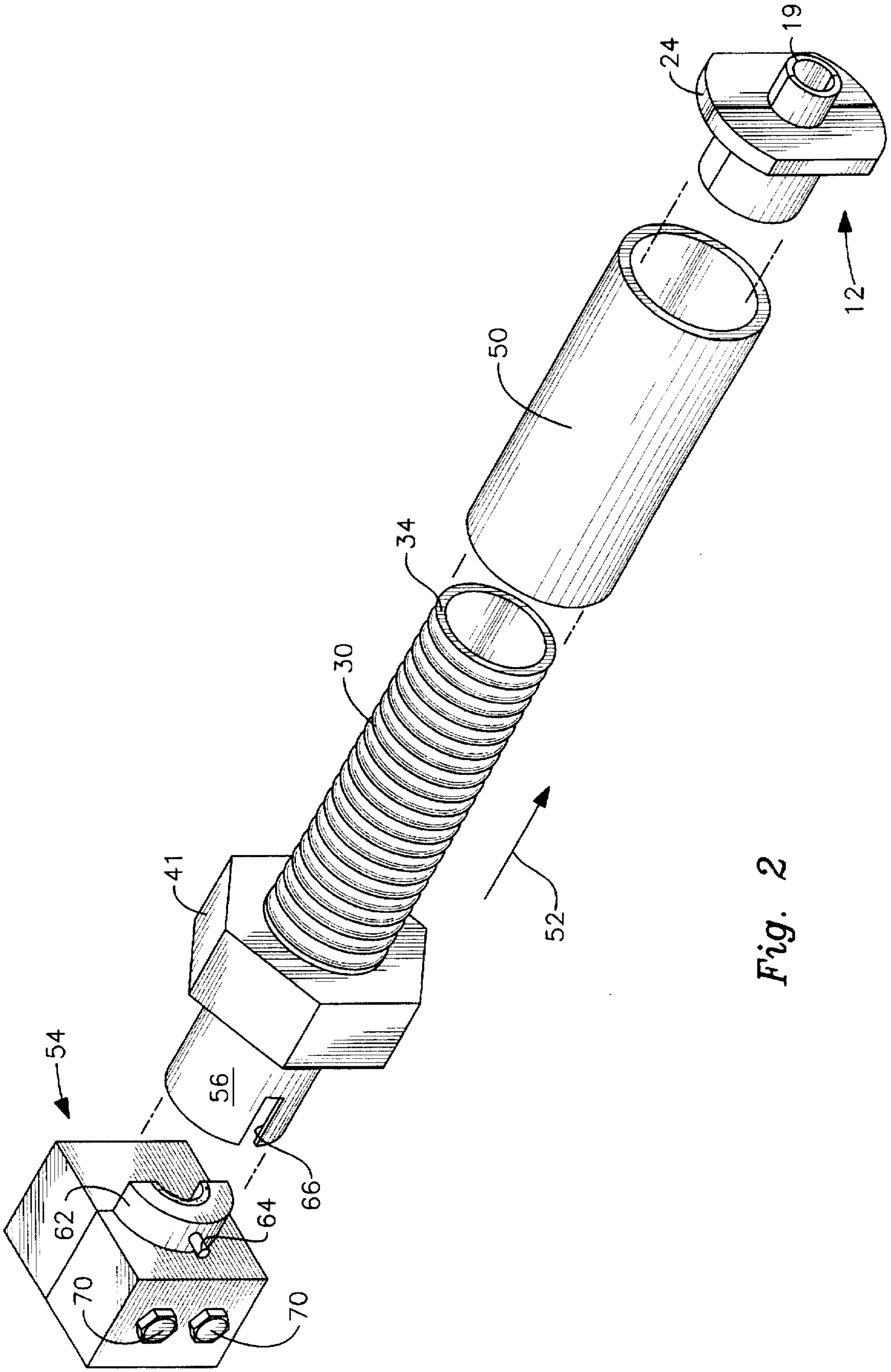
FIG. 2 is a partially exploded perspective view of the parts of a second illustrative embodiment.

In the second embodiment of FIG. 2, the drive means is provided in the form of a rigid, preferably steel drive tube 50 which supplants said coil spring 46. In either embodiment, advancing drive means push member 40, i.e., displacing it (or nut 41) in a trailing-to-leading direction as indicated by directional arrow 52, drives hosel 28 from shaft 18 when said hosel is thereafter heated to loosen the thermoplastic adhesive that secures it to said shaft, i.e., the hosel is pre-loaded before it is heated. This enables a very brief period of heat application.

It will be observed that guide tube 30 will rotate about its longitudinal axis as drive means push member 40 (or 41) advances, unless means are provided to prevent such rotation. The novel anti-rotation means is provided in the form of a two part, preferably steel stop member 54 that is secured to shaft 18 in abutting relation to trailing end 56 of guide tube 30. When assembled in sandwiching relation to shaft 18, part 60 of stop member 54 includes a semi-annular member 62 that is received within the trailing end 56 of guide tube 30. Alternatively, said semi-annular member 62 could extend in a leading direction from part 58. An anti-rotation post 64 extends in radial relation from semi-annular member 62 and extends through anti-rotation slot 66 formed in said guide tube trailing end 56. Thus, when stop member 54 is secured to shaft 18 and held in a vice or other suitable gripping means, guide tube 30 cannot rotate relative to stop member 54, i.e., said guide tube 30 cannot rotate about its longitudinal axis when disc member 40 is rotated, nor can said guide tube displace in a leading-to-trailing direction. Accordingly, advancing said drive means push member 40 or 41 compresses coil spring 46 or applies pressure to steel drive tube 50 and hosel 28 is pushed off shaft 18, i.e., shaft 18 is pulled from hosel 28, when heat is applied to said hosel.

The means for securing stop member 54 to shaft 18 includes rubber pads, collectively denoted 68, that are positioned within respective tapered shaft-receiving channels formed in said stop member parts 58, 60. The pads prevent marring of the shaft by primary stop member 54 when the stop member is tightly secured to said shaft, and said pads also provide a strong frictional grip of said shaft to prevent rotation thereof. Stop member 54 is gripped by a table-mounted vice, not shown, when device 10 is in use.

The means for securing stop member 54 to shaft 18 further includes a pair of externally threaded bolts, collectively denoted 70. An internally threaded bore for screwthreadedly engaging said bolts is formed in primary stop member base parts 58, 60. Alternatively, a smooth bore is formed in the half part abutted by the respective heads of the bolts and an internally threaded bore is formed in the other half.

Stop member 54 thus not only prevents rotation of guide tube 30 with respect to shaft 18, it also prevents leading-to-trailing displacement of said guide tube as drive means push member 40 is advanced in a trailing-to-leading direction.

Significantly, as perhaps best understood in connection with FIG. 2, stop member 54 is positioned on shaft 18 at a point where said shaft is quite thick and thus quite strong, i.e., at a location remote from its thin, weak leading end.

About three thousand pounds of force is generated by advancing said drive means push member when the drive means is steel tube 50; therefore, the amount of heat that needs to be applied to said hosel when the novel apparatus is used is less than the amount required by shaft pullers heretofore known. Such reduction of temperature reduces the probability of damage to the shaft or discoloration of the hosel during the shaft-hosel separation procedure.

The ability to slide the novel apparatus over the hand grip 32 of shaft 18 reduces the amount of time required to perform the shaft-replacement job as well.

The quantity of material required to make the novel apparatus is considerably less than the quantity of material required for earlier shaft pullers. Thus, the apparatus occupies less space, is easier to store when not in use, and is easier to use when in use.

Steel tube drive means 50 is used when a stronger pull is required, but coil spring drive means 46 also performs well. Use of either drive means is safe because the shaft will not fly from the hosel at the moment of disengagement. Thus, no means are needed to restrain the shaft.

Figure 3B:
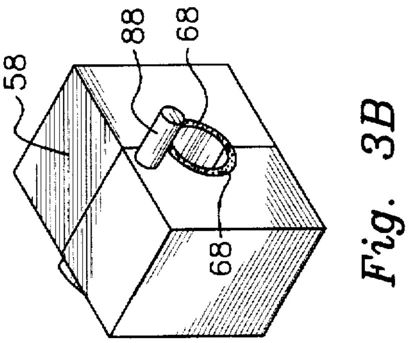
FIG. 3B is a perspective view depicting the trailing side of the primary stop member of the third embodiment.
Figure 3:
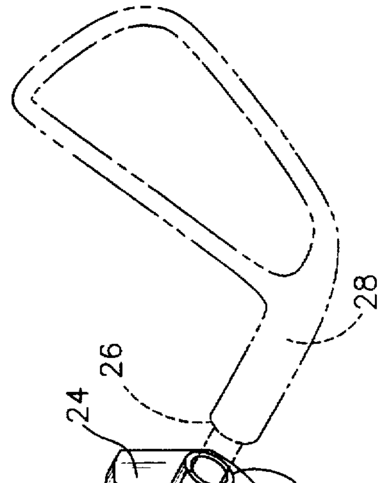
FIG. 3 is a perspective view of the parts of a third embodiment in their assembled configuration, said third embodiment including the auxiliary stop member of this invention.
Figure 3:
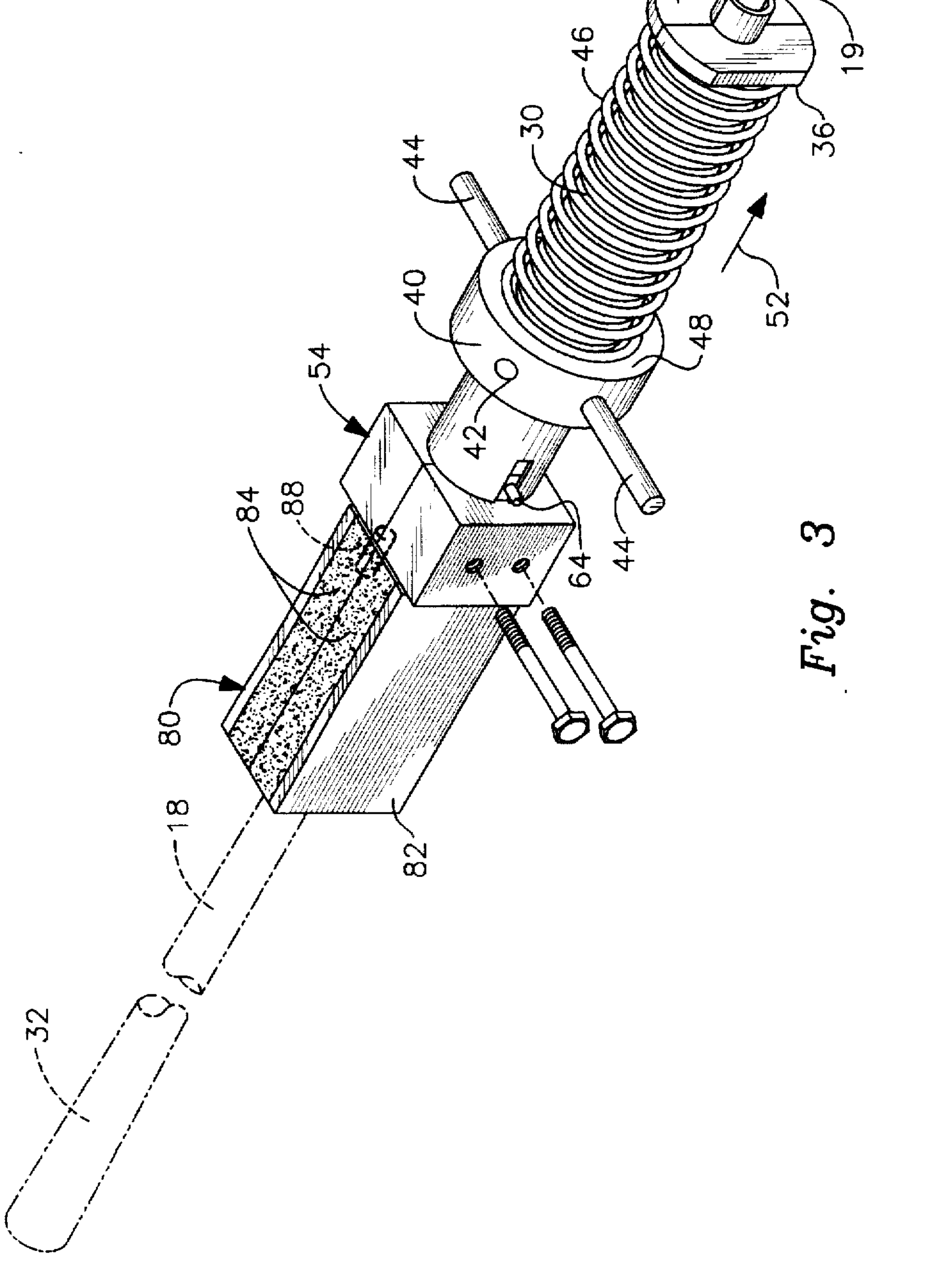
Figure 4:
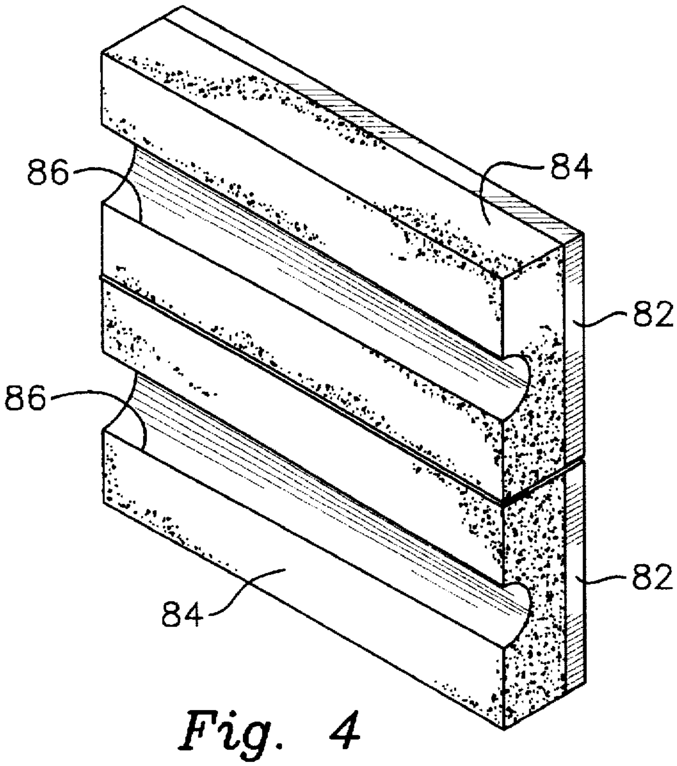
FIG. 4 is a perspective view of the novel auxiliary stop member of the third embodiment in its open configuration to better disclose its structure.
Figure 6:
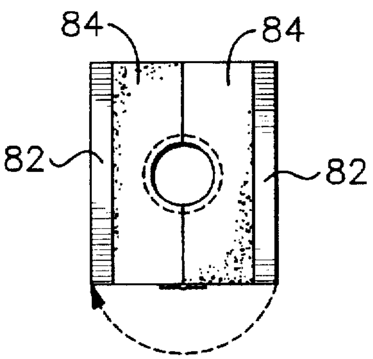
FIG. 6 is an end elevational view of the novel auxiliary stop member, with an arrow indicating how it is opened to its FIG. 4 configuration.
Figure 5:
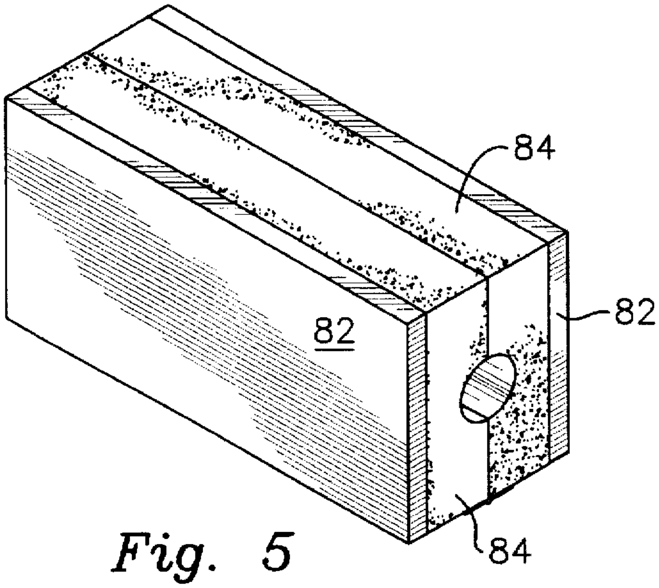
FIG. 5 is a perspective view of the novel auxiliary stop member in its closed configuration.

In a third embodiment, depicted in FIG. 3, steel tube 50 is employed to the exclusion of coil spring 46, as in the second embodiment. An auxiliary stop member in the form of shaft-gripping member 80 is disposed in abutting relation to the trailing end of primary stop member 54. As best understood in connection with FIGS. 4–6, member 80 includes opposed flat metallic outer surfaces 82 and opposed elastomeric inner pads 84 having tapered grooves 86 formed therein. Pads 84, preferably, have a 65–95 Durometer A hardness rating. Note that auxiliary stop member 80 has a longitudinal extent two or three times greater than the longitudinal extent of primary stop member 54. Thus, member 80 adds considerable shaft-gripping strenth; it virtually insures that primary stop member 54 will not slip in a leading-to-trailing direction when drive means push member 40 is rotated.

The taper of grooves 86 matches the taper of shaft 18.

A conventional table-mounted vice, not shown, is used to grip opposed outer surfaces 82. Thus, the vice prevents rotation of auxiliary shaft-gripping member 80 during rotation of disc member 40 or nut 41.

As best understood in connection with FIG. 3B, an additional anti-rotation means in the form of a rod 88 is secured to the trailing end of primary stop member 54, in substantially parallel relation to shaft 18, so that said rod is positioned in sandwiched relation between opposed elastomeric pads 84. In this manner, additional rotational resistance is applied to primary stop member 54, i.e., with auxiliary stop member 80 being held against rotation by a table-mounted vice, rod 88, in effect, transmits such rotational resistance to primary stop member 54.

The auxiliary stop member increases the effective surface contact area between the shaft and the primary stop member and reduces the surface pressure on the shaft that must be supplied by the primary stop member. Thus, the use of both the primary and the auxiliary stop members enables use of the novel device on very tender shafts, i.e., such stop members distribute the pounds of pressure applied to the shaft over a larger area, thereby reducing the surface pressure applied to any particular point while increasing the overall pressure or shaft-gripping power applied to prevent guide tube slippage. The result is the ability to apply an even greater hosel removal force at even lower temperatures relative to the removal force and temperatures of the first and second embodiments.

With the extra anti-slip and anti-rotational grip provided by auxiliary stop member 80 and rod 88, any clubhead (except aluminum) is removable in about fifteen seconds upon rotation of disc member 40 or nut 41, with little or no heat applied to the hosel.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described:

What is claimed is:

1. An apparatus that separates a hosel of the golf club shaft and a golf club head that are secured to one another by an adhesive, comprising:

a guide tube member having a diameter sufficient to axially receive therein the shaft and hand grip of a golf club;

a hosel push member positioned at a leading end of said guide tube member, said hosel push member having a leading end adapted to abuttingly engage an annular shoulder defined by a juncture of said shaft and said hosel, said hosel push member having a trailing end slideably received within said leading end of said guide tube member, said hosel push member having a radially outwardly extending flange positioned between the leading and trailing ends of said hosel push member, and said leading end of said guide tube disposed in abutting relation to a trailing side of said flange;

said guide tube having external threads formed substantially along its extent;

an internally threaded drive means push member disposed in screwthreaded engagement with said external threads of said guide tube so that said internally threaded drive means push member is displaced in a trailing-to-leading direction toward said hosel when rotated in a first direction and in a leading-to-trailing direction away from said hosel when rotated in a second direction;

a drive means disposed in ensleeving relation to said guide tube, said drive means having a leading end abutting said trailing side of said flange of said hosel push member and said drive means having a trailing end abutting a leading side of said drive means push member;

a primary stop member secured to said shaft in abutting relation to a trailing end of said guide tube, said primary stop member adapted to prevent rotation and leading-to-trailing displacement of said guide tube upon rotation of said drive means push member;

an auxiliary stop member positioned in abutting relation to a trailing end of said primary stop member, said auxiliary stop member including a pair of opposed, hard gripping surfaces adapted for engagement by a vice, a pair of opposed elastomeric pad members sandwiched between said gripping surfaces, and a pair of opposed grooves formed in said pad members, said opposed grooves being tapered to receive therebetween said golf club shaft;

whereby advancement of said internally threaded drive means push member in a trailing-to-leading direction applies pressure to said drive means in said trailing-to-leading direction and hence said hosel push member and said hosel in said trailing-to-leading direction so that said hosel separates from said shaft when said adhesive is thereafter weakened by application of heat to said hosel; and whereby a mounted vice grip holding said opposed surfaces of said auxiliary stop member inhibits slipping of said auxiliary stop member in a leading-to-trailing direction when said internally threaded drive means push member is rotated.

2. The apparatus of claim 1, further comprising a rod secured to a trailing end of said primary stop member, said rod disposed in parallel relation to said shaft, and said rod disposed in sandwiched relation between said elastomeric pad members of said auxiliary stop member so that said vice grip also inhibits rotation of said primary stop member when said drive means push member is rotated.

3. The apparatus of claim 1, wherein said drive means is a coil spring, and wherein said coil spring is compressed by said drive means by a distance substantially equal to a depth of penetration of said drive shaft into said hosel.

4. The apparatus of claim 1, wherein said drive means is a rigid tube.

5. The apparatus of claim 1, wherein said primary stop member includes a base and a semi-annular leading end, said semi-annular leading end being sized for sliding reception into said trailing end of said guide tube, a rigid post extending radially outwardly from said semi-annular leading end, a longitudinally-extending slot formed in said trailing end of said guide tube, and said rigid post being received within said longitudinally-extending slot so that said guide tube cannot rotate with respect to said primary stop member.

6. The apparatus of claim 1, wherein said hosel push member is made of two symmetrical parts to facilitate installation thereof onto said shaft.

7. The apparatus of claim 1, wherein said primary stop member is made of two symmetrical parts to facilitate installation thereof onto said shaft.

8. The apparatus of claim 1, further comprising a cushioning means disposed between said shaft and said primary stop member.

9. The apparatus of claim 1, wherein said drive means push member is a disc-shaped member having at least one radially extending bore formed therein, and further comprising a rigid rod for insertion into said at least one bore to enable rotation of said drive means push member relative to said guide tube.

10. The apparatus of claim 1, wherein said drive means push member is a wrench-engageable nut.

* * * * *